United States Patent [19]

Furukawa

[11] Patent Number: 4,668,901
[45] Date of Patent: May 26, 1987

[54] QUICK CHARGING CIRCUIT

[75] Inventor: Kaoru Furukawa, Hikone, Japan

[73] Assignee: Matsushita Electric Works, Ltd., Osaka, Japan

[21] Appl. No.: 724,574

[22] Filed: Apr. 18, 1985

[30] Foreign Application Priority Data

Jun. 11, 1984 [JP] Japan .................................. 59-119297

[51] Int. Cl.$^4$ ............................ H02J 7/04; H02J 7/10
[52] U.S. Cl. ........................................ 320/31; 320/21; 320/23; 320/39
[58] Field of Search ..................... 320/20, 21, 37, 38, 320/31

[56] References Cited

U.S. PATENT DOCUMENTS 3,609,502  9/1971  Burkett et al. ..................... 320/21 X
3,944,904  3/1976  Hase ................................. 320/21 X

FOREIGN PATENT DOCUMENTS 0034740  2/1982  Japan .

Primary Examiner—R. J. Hickey
Attorney, Agent, or Firm—Burns, Doane, Swecker & Mathis

[57] ABSTRACT

A quick charging circuit comprises a charging current generating circuit including a rectifier connected to an A.C. power source and a high frequency inverter connected to the rectifier for supplying a charging current to a storage battery, a circuit for detecting a voltage across the battery, a timer circuit operated by an output of the battery voltage detecting circuit, and means for reducing the charging current in response to a time limit output of the timer circuit, wherein an integrating circuit is provided with respect to the battery voltage detecting circuit so that any influence of high frequency components in the battery voltage can be removed, whereby the timer circuit can be operated accurately with a set voltage to reduce the charging current and to reliably prevent the battery from being subjected to any overcharging and internal pressure rise.

1 Claim, 7 Drawing Figures

QUICK CHARGING CIRCUIT

TECHNICAL BACKGROUND OF THE INVENTION

This invention relates to inverter type quick charging circuits for storage batteries in such small electric devices as electric shavers and the like which are self-contained.

The quick charging circuit of the type referred to comprises generally a charging current generating circuit for providing a rectified charging current to a storage battery, a circuit for detecting a voltage across the battery, a timer circuit actuated by an output of the battery voltage detecting circuit, and means for interrupting or reducing the charging current in response to a time limit output of the timer circuit, wherein the battery voltage detecting circuit detects a predetermined level of the battery voltage lower than the peak level to operate the timer circuit and reduce the charging current for the battery to a level at which the charging operation up to the peak level can be effectively continued without causing any overcharging nor deterioration of the battery.

DISCLOSURE OF PRIOR ART

Generally, the circuit for quickly charging the storage battery is arranged so that, when the charging voltage in the battery exceeds a predetermined level, the circuit can detect this and interrupt or largely reduce the charging current. Generally speaking, the charging capacity of the battery substantially reaches its saturated level, that is, a fully charged state of the battery is reached at a time $t_3$ following a time $t_2$ at the latter of which the charging voltage reaches its peak, as shown in FIG. 7, and theoretically it will be proper to interrupt or remarkably reduce the charging current at the time $t_3$. In practice, however, it must be taken into consideration that the battery reaches its saturated level before the time $t_3$ due to fluctuations in the charging characteristics of individual one of the batteries, and further it has been known that, as the charging voltage approaches the peak, the internal pressure of the battery will abruptly rise due to generated gases and the like. For the purposes of ensuring the prevention of overcharging and internal pressure rise of the battery, therefore, it is necessary at least to reduce the charging current at a time $t_1$ before the time $t_2$ at which the charging voltage reaches the peak.

A quick charging circuit for attaining this object has been proposed in Japanese Patent Appln. Laid-Open Publication No. 34740/1982, in which a rectifier connected to an A.C. power source is connected in series with a storage battery and with the collector and emitter of a main transistor, the battery is connected to a voltage detecting circuit, and a field effect transistor (FET) and another transistor are connected to the base of the main transistor so that, when the voltage detecting circuit has detected a predetermined charging voltage before reaching its peak, the FET and another transistor are sequentially turned OFF in response to variations in the output of the voltage detecting circuit. Therefore, after the voltage detecting circuit has detected the predetermined charging voltage, the FET, another transistor and main transistor will function as a so-called timer which gradually reduce the charging current to a remarkably low level, and the intended operation can be realized if the detection level of the voltage detecting circuit is set to be a charging voltage at, for example, the time $t_1$ shown in FIG. 7.

This arrangement, however, has been involving an awkward problem in applying it to a quick charging circuit which comprises a charging current generating circuit including a high frequency inverter. More specifically, in such an inverter type quick charging circuit, the energy so far accumulated in a transformer during conductive period of a main transistor connected to the primary winding of the transformer is induced in the secondary winding of the transformer at the time when the main transistor is made non-conductive, a thus induced current is provided to the storage battery through a diode showing its normal direction with respect to the induced current, and such conduction and non-conduction of the main transistor are continuously repeated until the fully charged state of the battery is reached. In this operation, the charging current is of a saw tooth waveform, the peak of which reaches even a level 3 or 5 times the average value of such uneven charging current. Accordingly, this charging current provides seemingly a relatively high level even in regions out of the actual peak but, when this charging current flows into the battery, the normal battery voltage will be affected by a voltage drop caused due to an internal resistance of the battery or any wiring resistance. In the quick charging circuit of the Publication referred to as an example, therefore, there has been a problem that the voltage detecting circuit is readily caused to operate at a voltage lower than an actually set level, in other words, with a battery voltage below that at the time $t_1$ in FIG. 7 so as to reduce the charging current with the charging capacity considerably left unfilled up to the full charging for which it still requires so long time that renders the quick charging impossible. It should be appreciated that even a setting of the time $t_1$ to be earlier taking into account a possible fluctuation or a variation with time elapsed in the internal resistance of the battery will render this problem to be rather remarkable.

TECHNICAL FIELD OF THE INVENTION

A primary object of the present invention is, therefore, to provide an inverter type quick charging circuit which allows the battery voltage detecting circuit to accurately detect the set-time battery voltage even with the provision of the charging current generating circuit including a high frequency inverter, whereby the timer circuit generating the time limit output can be also accurately actuated, the charging current can be reduced properly after achieving a predetermined level of the charging capacity even when a detection time of the voltage detecting circuit is set taking sufficiently into consideration the fluctuation or elapsing variation in the internal resistance of storage batteries, and thus a practically full charging can be achieved at a high efficiency.

According to the present invention, this object can be realized by providing a charging circuit comprising a charging current generating circuit including a rectifier to be connected to an A.C. power source and a high frequency inverter connected to the rectifier for supplying a charging current to a storage battery, a circuit for detecting a voltage across the battery, a timer circuit operated by a detection output of the battery voltage detecting circuit, and means for reducing the charging current in response to a time limit output of the timer circuit, in which an integrating circuit is provided with respect to the battery voltage detecting circuit for providing to the timer circuit the detection output from which any influence of high frequency components is removed.

Other objects and advantages of the present invention shall become clear from the following description of the invention detailed with reference to preferred embodiments illustrated in accompanying drawings.

Figure 1:
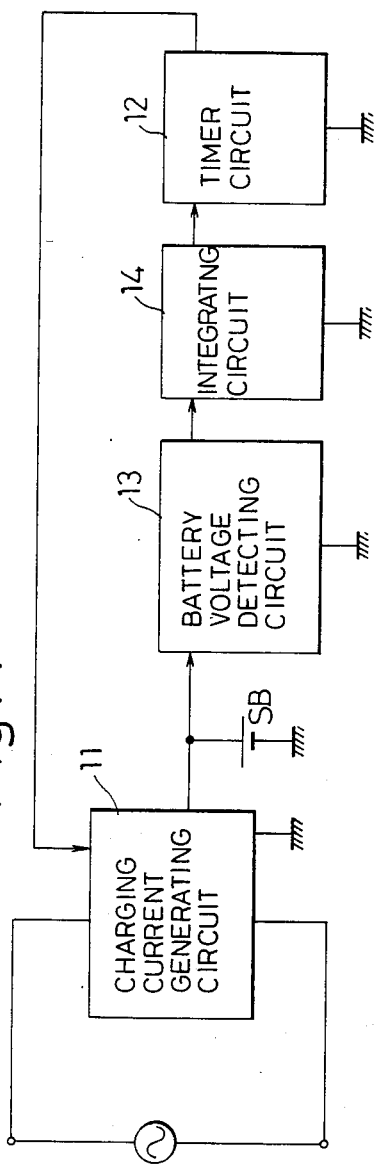
FIG. 1 is a block diagram of an embodiment of an inverter type quick charging circuit according to the present invention.

While the present invention shall now be described with reference to the preferred embodiments shown in the drawings, it should be understood that the intention is not to limit the invention only to the particular embodiments shown but rather to cover all alterations, modifications and equivalent arrangements possible within the scope of appended claims.

DISCLOSURE OF PREFERRED EMBODIMENTS

Referring to FIG. 1 showing in a block diagram an embodiment of the inverter type quick charging circuit according to the present invention, the circuit includes a charging current generating circuit 11 which comprises a rectifier to be connected to an A.C. power source and an inverter through which the circuit 11 supplies a charging current to a storage battery SB, while the circuit 11 receives a time limit output from a timer circuit 12, upon which the charging current being supplied to the battery SB is reduced. The timer circuit 12 is so arranged as to receive through an integrating circuit 14 an output of a battery voltage detecting circuit 13 connected to the battery SB, and to be actuated when the voltage in the battery SB reaches a predetermined level. In this case, the charging voltage applied through the inverter to the battery SB is of a high frequency pulsating current and thus the voltage detected by the battery voltage detecting circuit 13 is also of the high frequency pulsating type, but any influence of the high frequency component on the detected voltage can be removed as passed through the integrating circuit 14.

The arrangement and operation of the embodiment of FIG. 1 shall be further detailed with reference to FIG. 2. The rectifier 15 included in the charging current generating circuit 11 is to be connected to an A.C. power source S through a protection circuit 16 which comprises a pair of protective resistances $R_1$ and $R_2$ and a varistor ZNR, and supplies a rectified current to the inverter 17 at the subsequent stage also in the circuit 11. In this inverter 17, a transformer T is connected at the primary winding $L_1$ to the collector of a main switching transistor $Q_1$, and is provided with a feedback winding $L_3$ coupled to the primary winding $L_1$ in positive feedback relation thereto and connected through a resistance $R_3$ to the base of the transistor $Q_1$, the emitter of which is connected through a voltage detecting resistance $R_4$ to the storage battery SB. The secondary winding $L_2$ of the transformer T is connected through a diode $D_1$ to the battery SB, so that the energy accumulated in the winding $L_1$ during conductive periods of the transistor $Q_1$ as biased through a starting resistance $R_5$ will be induced in the secondary winding $L_2$ upon non-conduction of the transistor $Q_1$, and the charging current will be supplied to the battery SB through the diode $D_1$ which shows the normal direction with respect to a current generated upon the induction.

Further, a transistor $Q_2$ is provided in Darlington connection between the base and emitter of the main switching transistor $Q_1$, and another switching transistor $Q_3$ is connected between the base of the transistor $Q_1$ and a connecting end of the voltage detecting resistance $R_4$ with the battery SB. In this case, the Darlington connection transistor $Q_2$ is to be made conductive with an applied voltage as raised due to an alteration of the source voltage from, for example, 100 V to 120 V, upon which conduction the base current of the main transistor $Q_1$ is bypassed to be reduced, whereby the collector current of the transistor $Q_1$ during its conduction is reduced. Thus, the transistor $Q_2$ performs a function of rendering the amount of energy accumulated in the transformer under the relatively higher source voltage to be substantially equal in the average value to that under the relatively lower source voltage, and thus the charging current to the battery SB to be substantially constant even under the different source voltages. On the other hand, the switching transistor $Q_3$ is to be made conductive as biased by a time limit output of the timer circuit which is integrated as will be described later, the base current of the main transistor $Q_1$ is thereby bypassed to reduce the collector current, and thus the switching transistor $Q_3$ functions to reduce the charging current.

The feedback winding $L_3$ of the transformer T is connected with a speed-up capacitor $C_1$ which acts to absorb the base charge of the main transistor $Q_1$ upon its non-conduction and, in parallel to this speed-up capacitor $C_1$, there are connected a resistance $R_6$ and diode $D_2$ in the normal biasing direction of the transistor $Q_1$ as well as a diode $D_3$ in the reverse biasing direction thereof, so that the main switching transistor $Q_1$ will be prevented from being caused to erroneously operate with any excessive load imposed to the base of the transistor $Q_1$ due to an overdischarging or reverse charging of the battery SB or the like. Across the primary winding $L_1$ of the transformer T, a diode $D_4$ and a parallel circuit of a capacitor $C_2$ and resistance $R_7$ are connected in series, so as to absorb a spike voltage generated in the primary winding $L_1$.

Figure 7:
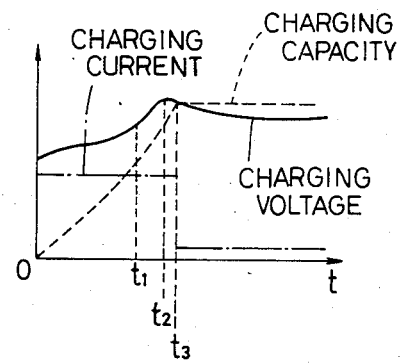
FIG. 7 shows diagrammatically the relationship of charging time to the charging voltage, charging current and charging capacity.

The battery voltage detecting circuit 13 includes a detecting integrated circuit $IC_1$ which receives a current from a winding $L_4$ wound on the same core as the primary winding $L_1$ of the transformer T through a rectifying/smoothing circuit of a diode $D_4$ and capacitor $C_3$. The integrated circuit $IC_1$ is connected at its input terminal $a_1$ to the battery SB through a detected voltage adjusting resistance $R_8$, so as to detect the battery voltage that has exceeded such a predetermined level at the time $t_1$ as shown in FIG. 7 and to provide a low level signal at an output terminal $b_1$. The circuit IC$_1$ is connected at the output terminal b$_1$ to a diode D$_5$ of the integrating circuit 14 which further includes a capacitor C$_4$ and Zener diode ZD$_1$ which are mutually parallel and are connected to the diode D$_5$, the Zener diode ZD$_1$ being connected through voltage dividing resistances R$_9$ and R$_{10}$ to the base of a transistor Q$_4$. Accordingly, the integrating circuit 14 receives the low level signal through the diode D$_5$ so that, when a voltage across the capacitor C$_4$ becomes lower than a set voltage of the Zener diode ZD$_1$, the transistor Q$_4$ will not be biased and will be thus made non-conductive.

The timer circuit 12 includes another integrated circuit IC$_2$ which receives, in the similar manner to the foregoing integrated circuit IC$_1$, the current fed through the rectifying/smoothing circuit of the diode D$_4$ and capacitor C$_3$. This integrated circuit IC$_2$ is connected at an input terminal a$_2$ to the collector of the transistor Q$_4$ connected to the integrating circuit 14 so that, when the transistor Q$_4$ is non-conductive, the input terminal a$_2$ will be at a high level which starts the timer integrated circuit IC$_2$ to operate and, after a set time period elapsed, the circuit IC$_2$ will provide at the output terminal b$_2$ an output for biasing the switching transistor Q$_3$ for a contribution to the reduction in the charging current. In this case, it is preferable to connect a restraining circuit including a Zener diode ZD$_2$ and transistor Q$_5$ to the output terminal b$_2$ so that, when the input terminal a$_2$ of the timer integrated circuit IC$_2$ is at the high level, the switching transistor Q$_3$ will not be biased.

The storage battery SB may also be connected through a switch SW to such a load as a motor M or the like.

The operation of the circuit of FIG. 2 shall be described in detail with reference to FIG. 3. When the A.C. power source S is connected to the charging circuit, a rectified voltage is applied through the rectifier 15 to the inverter 17. This causes the main transistor Q$_1$ to be biased through the starting resistance R$_5$. As the transistor Q$_1$ is also receiving at the base an input from the feedback winding L$_3$ coupled in the positive feedback relation, the transistor Q$_1$ is quickly turned ON and thereafter repeats ON and OFF operations, and the base-emitter voltage of the transistor Q$_1$ is caused to vary as shown in FIG. 3(a). Here, the collector current of the main transistor Q$_1$ will be a pulsating current of a high frequency which has an abrupt peak upon each ON operation of the transistor Q$_1$ as shown in FIG. 3(b), and the charging current induced in the secondary winding L$_2$ of the transformer T will be also such a pulsating current having an abrupt peak upon each OFF operation of the transistor Q$_1$ as shown in FIG. 3(c). Accordingly, the battery voltage of the battery SB has such a saw tooth waveform having sharp peaks as shown in FIG. 3(d) and, in response thereto, such a rectangular wave output as shown in FIG. 3(e) is provided from the battery voltage detecting circuit 13. The voltage of the integrating circuit 14 will not become lower than a set voltage V$_{SET}$ as shown in FIG. 3(f) until, for example, the time t$_1$ of FIG. 7 is reached and the transistor Q$_4$ will not be turned OFF. When the average value of the detected voltages has become a predetermined value in correspondence to such a voltage as the battery voltage at the time t$_1$ in FIG. 7, the output of the integrating circuit 14 drops below the set voltage V$_{SET}$ to cause the transistor Q$_4$ turned OFF, and such a high level as shown in FIG. 3(g) is applied to the timer circuit 12. This causes the timer circuit 12 to operate so that, after a predetermined time elapsed, a biasing output will be provided at the output terminal a$_2$ for causing the transistor Q$_3$ turned ON. Accordingly, the bias current of the main switching transistor Q$_1$ is bypassed to the transistor Q$_3$, and the charging current to the battery SB is reduced in the similar manner to the case when the transistor Q$_2$ of Darlington connection is turned ON. Then, the output of the battery voltage detecting circuit 13 is applied to the timer circuit 12 through the integrating circuit 14 as well as the transistor Q$_4$ which is turned OFF upon the low level output of the circuit 14, whereby the timer circuit 12 will not be actuated until the battery voltage reaches in the average value such a predetermined voltage level at the time t$_1$ as shown in FIG. 7, whereas the timer circuit 12 will be actuated upon the predetermined level reached by the average battery voltage, and the transistor Q$_3$ is biased after the set period of the timer elapsed to reduce the charging current, so that the storage battery will be effectively prevented from being overcharged, subjected to any excessive rise in the internal pressure, or deteriorated in the durability, even with the use of the charging current generating circuit 11 including the high frequency inverter.

Figure 4:
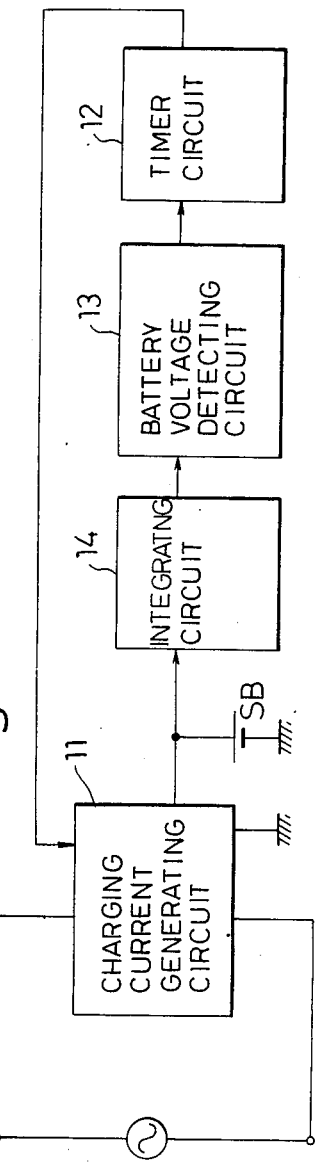
FIG. 4 is a block diagram of another embodiment of the quick charging circuit according to the present invention.
Figure 2:
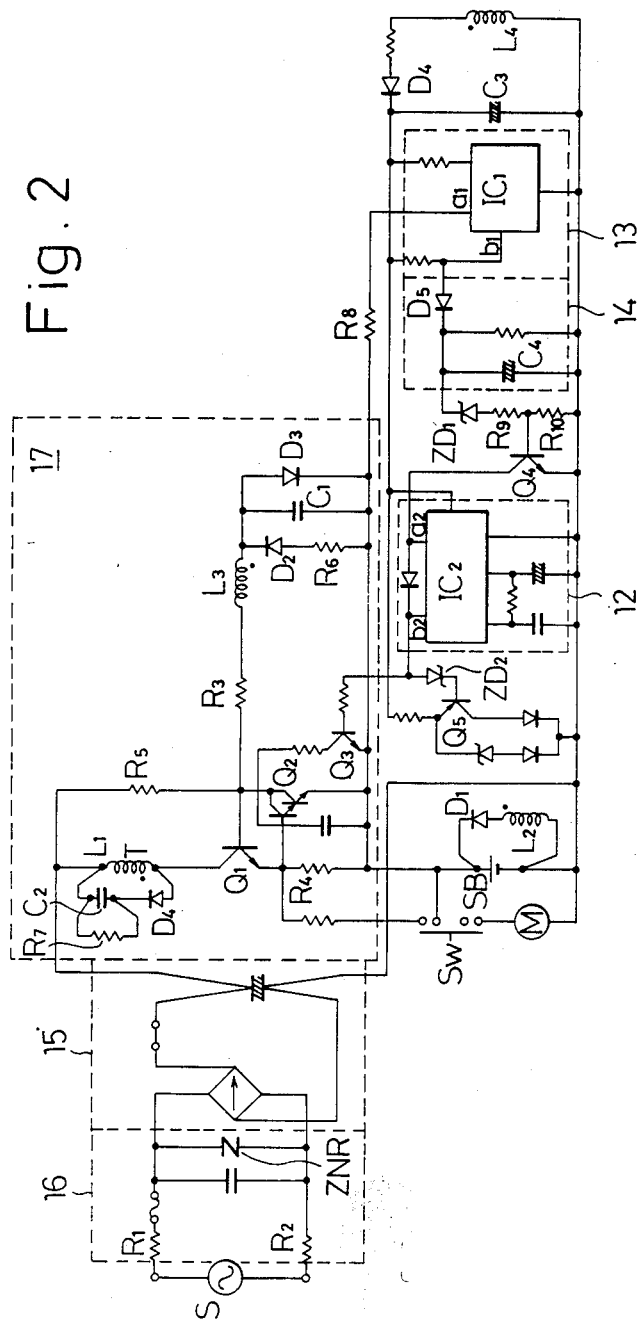
FIG. 2 is a detailed circuit diagram for the embodiment of FIG. 1.
Figure 3:
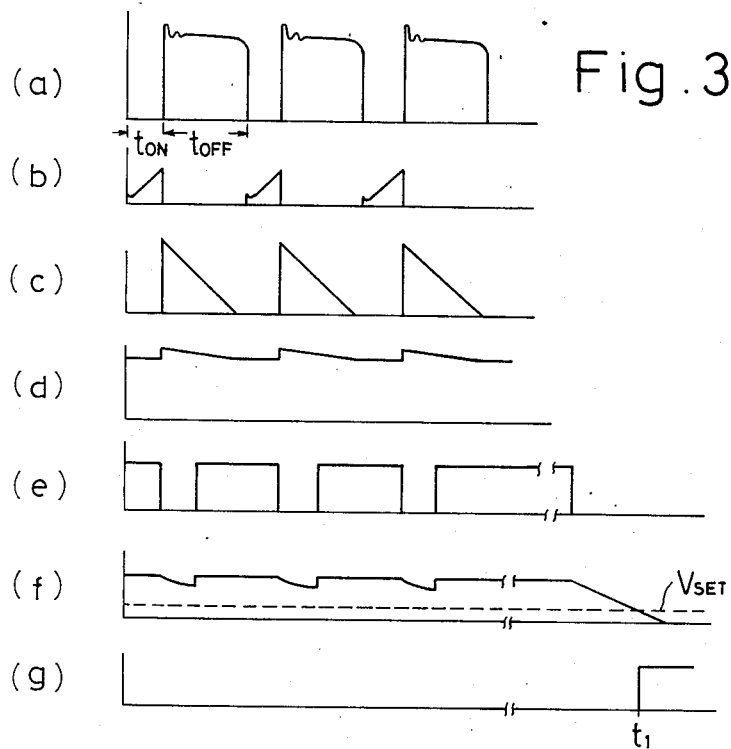
FIG. 3 shows waveforms of signals appearing at various points in the circuit of FIG. 2.
Figure 6:
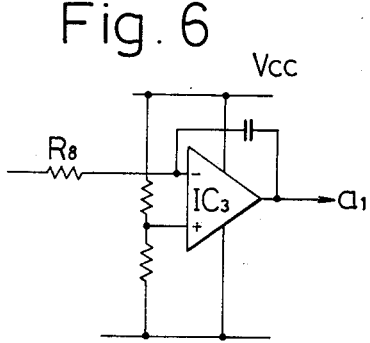
FIG. 6 is a partial circuit diagram showing a modification at a part of the circuit of FIG. 5.
Figure 5:
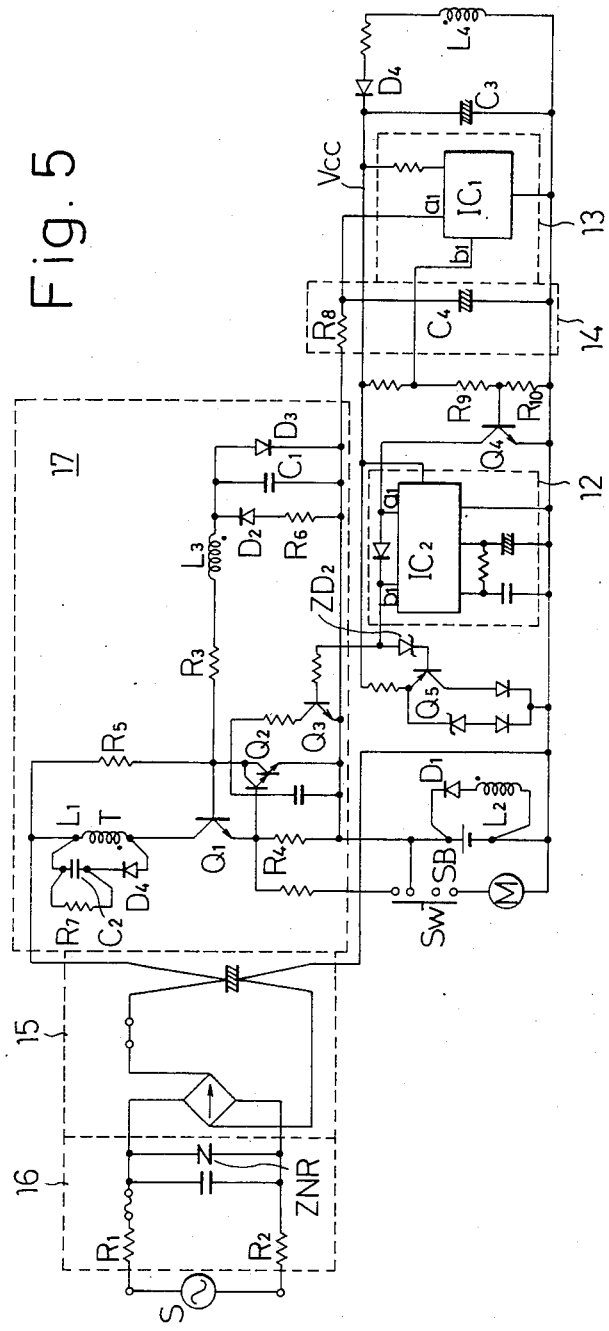
FIG. 5 is a detailed circuit diagram for the embodiment of FIG. 4.

FIGS. 4 and 5 show another embodiment of the inverter type quick charging circuit according to the present invention, in which the same constituent elements as those in the embodiment of FIGS. 1 and 2 are represented by the same reference numerals. In the present instance, the integrating circuit 14 is placed at the preceeding stage of the battery voltage detecting circuit 13, instead of the subsequent stage thereof. For this reason, the high frequency components in such a saw tooth waveform as in FIG. 3(d) can be removed by the output of the integrating circuit 14 shown in FIG. 3(f), and the same operation as in the case of the foregoing embodiment can be obtained in the present embodiment. Other arrangement and operation are substantially the same as those in the embodiment of FIG. 2. Such an operational amplifier IC$_3$ as shown in FIG. 6 may be used for the integrating circuit 14 in the embodiment of FIGS. 4 and 5, so as to absorb the high frequency components in the battery voltage in the manner similar to the integrating circuit 14.

What is claimed as our invention is:

1. A quick charging circuit comprising:
    a charging current generating circuit including a rectifier connected to an A.C. power source and a high frequency invertor connected to said rectifier for supplying a charging current to a storage battery wherein said high frequency invertor includes a first switching transistor connected at the collector to the primary winding of a transformer connected at the secondary winding to said storage battery, and a second switching transistor for bypassing a base current which biases said first switching transistor and reducing said charging current;
    a circuit for detecting a voltage across said battery including a detecting IC circuit which generates a low level output upon detection of a predetermined voltage;
    an integrating circuit provided with respect to said battery voltage detecting circuit for restraining any influence of high frequency components in said battery voltage wherein said integrating circuit is connected to a third transistor which is turned OFF with an output lower than a set level in response to said low level output of said detecting IC circuit and wherein said integrating circuit is connected after said battery voltage detecting circuit; and a timer circuit operated by an output of said battery voltage detecting circuit wherein said timer circuit has an input terminal connected to the collector of said third transistor, is actuated upon a high level at said input terminal, and provides after a predetermined time elapsed, an output for biassing said second switching transistor thereby controlling a base current biassing said first switching transistor and reducing said charging current, and wherein said timer circuit is connected after said integrating circuit.

* * * * *